(12) United States Patent
Holmdahl et al.

(10) Patent No.: US 10,879,518 B1
(45) Date of Patent: Dec. 29, 2020

(54) STACK-WOUND BATTERY CONFIGURATION

(71) Applicant: Amazon Technologies, Inc., Seattle, WA (US)

(72) Inventors: Bryan Holmdahl, Santa Clara, CA (US); Ramez Nachman, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 303 days.

(21) Appl. No.: 15/826,160

(22) Filed: Nov. 29, 2017

(51) Int. Cl.
*H01M 2/26* (2006.01)
*H01M 10/04* (2006.01)
*H01M 4/64* (2006.01)

(52) U.S. Cl.
CPC ............. *H01M 2/263* (2013.01); *H01M 4/64* (2013.01); *H01M 10/0431* (2013.01)

(58) Field of Classification Search
CPC ....... H01M 10/05–0525; H01M 10/056–0587; H01M 2/14–185; H01M 2/20; H01M 2/22; H01M 2/26–263
See application file for complete search history.

(56) References Cited

U.S. PATENT DOCUMENTS

| | | | | |
|---|---|---|---|---|
| 6,692,543 | B1 * | 2/2004 | Hamano | H01M 10/0525 29/623.4 |
| 2001/0053476 | A1 * | 12/2001 | Ruth | H01M 2/0285 429/174 |
| 2010/0081052 | A1 * | 4/2010 | Morishima | H01M 2/263 429/211 |
| 2010/0124694 | A1 * | 5/2010 | Hikata | B26F 1/384 429/94 |
| 2011/0104550 | A1 * | 5/2011 | Ahn | H01M 2/18 429/131 |

FOREIGN PATENT DOCUMENTS

KR   2015-0040421   *   4/2015   ........ H01M 10/0587

OTHER PUBLICATIONS

Machine Translation of Korean Publication KR 2015-0040421 (Year: 2015).*

* cited by examiner

*Primary Examiner* — Jonathan Crepeau
*Assistant Examiner* — Jacob Buchanan
(74) *Attorney, Agent, or Firm* — Quarles and Brady LLP (57) ABSTRACT

A battery includes a housing and a laminate in the housing. The laminate includes an anode and cathode, each having a first end and an opposing second end. The anode includes an anode collector including a first sheet of patterned conductive material having a first active area and a first plurality of conductive tabs formed integrally with the first active area, and a first active material on the first active area of the anode collector. The cathode includes a cathode collector including a second sheet of patterned conductive material having a second active area and a second plurality of conductive tabs formed integrally with the second active area, and a second active material on the second active area of the cathode collector. Active material is not on either the first or second plurality of conductive tabs. A separator is positioned between the anode and the cathode.

16 Claims, 8 Drawing Sheets

STACK-WOUND BATTERY CONFIGURATION

BACKGROUND

Electronic devices are now an integral part of everyday life. Many of the electronic devices that are widely used are mobile devices (e.g., mobile phones, laptops, tablets, and/or the like). These devices require power to operate. Often power is provided to such devices, at least partially, by a battery. Such batteries may be designed to include different features (e.g., long life, flexibility, small size, and/or the like). Such features may directly relate to the user experience. For example, the battery may define how long an electronic device can operate before recharging. In some instances, different desirable features may be difficult to incorporate into a single battery. For example, the size of a battery may limit the amount of charge the battery can hold or how long an electronic device can operate without recharging. The size of the battery may be, for example, limited by an enclosure of a device being powered by the battery.

Naturally, the ability to enhance the performance of batteries without sacrificing other features similar to the features described above can enhance the user experience and satisfaction. Accordingly, there exists a need for systems and methods that can improve the performance of batteries while maintaining features similar to the features described above.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Generally, a battery (e.g., a pouch battery) may be configured to facilitate powering mobile electronic devices (e.g., mobile phones, tablets, remote controllers and/or the like) and/or other electronic devices (desktop computers, alarm systems, and/or the like).

In various implementations, battery cells are formed by winding long sheets of anode material and cathode material, separated by a porous layer, around a mandrel to form a generally cylindrical single cell battery. To form the battery's anode, a sheet of conductive material, referred to as the battery's anode collector, is at least partially coated in active anode material. The anode collector may include, for example, copper, with the active material formed over the anode collector including graphite, silicon, or graphite-silicon composite. Similarly, the battery's cathode is formed from a sheet of conductive material, referred to as the battery's cathode collector, that is at least partially coated in active cathode material. The cathode collector may include, for example, aluminum, with the active material formed over the cathode collector including Lithium Cobalt Oxide (LCO), Lithium Nickel Cobalt Manganese Oxide or Nickel Cobalt Manganese (NCM), Lithium Iron Phosphate (LFP), and/or lithium nickel cobalt aluminum. The structure including the combination of an anode collector and the anode's active material is referred to herein as the battery's anode. Similarly, the structure including the combination of a cathode collector and the cathode's active material is referred to herein as the battery's cathode.

In other to enable electrical connection between the anode and cathode of the battery, a number of conductive tabs are connected to both the anode collector and cathode collector. Typically, the conductive tabs are welded (e.g., via ultrasonic welding) or otherwise fastened to the anode and cathode collectors. The regions of the anode and cathode collectors to which the conductive tabs are to be fastened or welded are not coated in conductive material, leaving sufficient room for the conductive tabs to be attached directly to the anode or cathode collector.

When the battery's anode and cathode have been formed, the anode and cathode are formed into a laminate structure, with a separator layer sandwiched between the anode and cathode. The separator is a dielectric material and electrically isolates the battery's anode from the battery's cathode.

With the laminate formed, the laminate can be rolled into a cylinder and located within a suitable housing. The conductive tabs can then be attached to appropriate electrical contacts on the battery's housing, to put those contacts into electrical connection with the battery's anode or cathode.

In this wound and cylindrical configuration, the battery's capacity is generally determined by the surface areas of the anode collector and cathode collector that are coated with active materials and are positioned opposite one another in the rolled laminate structure. Regions of the anode and cathode that are not coated with active material—such as those regions left un-coated to facilitate connection of the conductive tabs—do not contribute to the battery's capacity. Similarly, regions of the anode and cathode that are coated in active material, but do not face one another when the laminate is wound into the cylindrical shape may not contribute to the battery's capacity for storing electrical charge.

In the present battery design, the battery's anode collector and cathode collector are each patterned from single sheet of conductive material into shapes that include conductive tabs. Because the anode and cathode collectors are patterned to include the conductive tabs, the process of manufacturing the battery does not require the additional step of welding (or otherwise fixing) conductive tabs to each of the anode collector and cathode collector. Consequently, there may be no requirement that regions of both the anode collector and cathode collector be uncovered in active material to facilitate the conductive tab welding process. As such, entire surfaces (e.g., a front and back surface) of each of the anode collector and cathode collector (other than the region used to pattern the conductive tabs) can be covered in active material. This, in turn, can increase the surface areas of the anode collector and cathode collector that are coated with active materials, thereby increasing the capacity of the battery and reducing unproductive anode and cathode collector material.

Furthermore, an alternative winding configuration is presented that uses the modified laminate configuration. In the present battery design, the anode and cathode layers are offset from one another by one panel in the battery's laminate. As such, at one end of the laminate, the anode layer protrudes by one panel, and at the other end of the laminate, the cathode layer protrudes by one panel. This enables, at the first end of the laminate, the anode to be wrapped around the end of the cathode. Similarly, at the second end of the laminate, the cathode material can be wrapped around the end of the anode material. This design option can maximize the surface area of each of the anode and cathode that is both covered in active material and positioned opposite active material of the opposite type. This also, in turn, increases the capacitance of the battery. With the laminate so formed, the laminate can be rolled into a cylindrical configuration and installed into a suitable housing. The conductive tabs, which are not covered in active material, can then be attached to appropriate electrical contact on the battery's housing, to put those contacts into electrical connection with the battery's anode or cathode.

The present battery design may be utilized within e-reader, tablet, and AuCC battery powered products, for example. The design may enable higher energy density (e.g., a 5-10% increase) as compared to conventional cylindrical battery designs, while providing the simplicity of assembly of a wound cell structure. In the present design, the collectors of the battery's anode and cathode are fully coated, front and back, in active material. The conductive tabs are formed integrally as part of the anode and cathode collectors to further simplify the manufacturing process.

Figure 1:
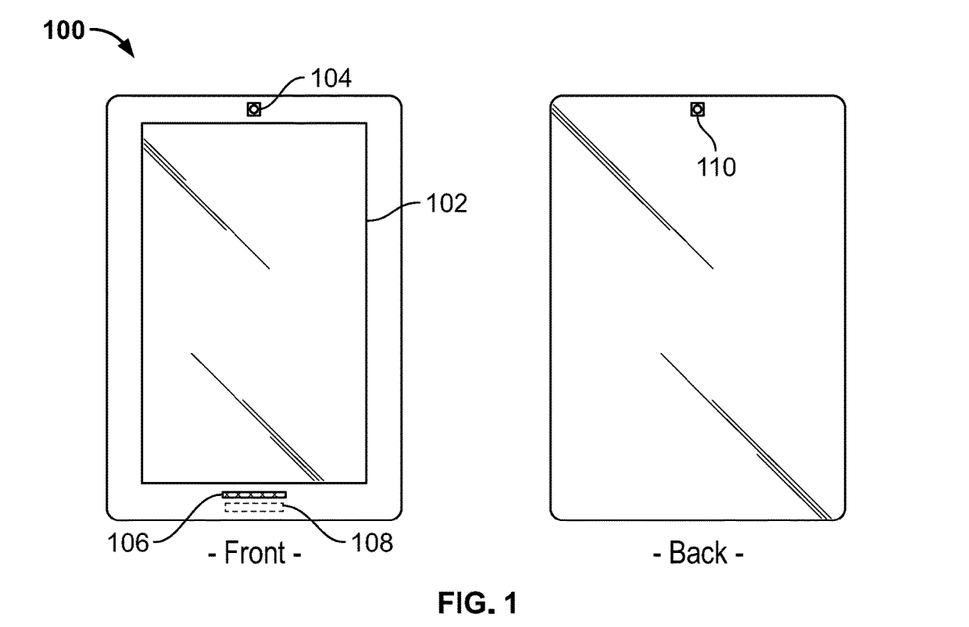
FIG. 1 illustrates front and back views of an example electronic device that can be used in accordance with various embodiments.

FIG. 1 illustrates front and back views, respectively, of an example electronic user device 100 that can incorporate a battery configured in accordance with the present disclosure. Although a portable computing device (e.g., an electronic book reader or tablet computer) is shown, it should be understood that any electronic device configured to utilize an electrical power source, such as a battery, or to incorporate other electrically energy storage systems or capacitors may incorporate a battery configured in accordance with the present disclosure. Example devices may include notebook computers, personal data assistants, smart phones, portable media players, electronic reader devices, and the like.

In this example, the user device 100 has an electronic display screen 102 on the front side, which under normal operation will display information to a user facing the display screen (e.g., on the same side of the computing device as the display screen). The electronic display screen 102 may include a lighting component, such as a backlight or front light, which provides illumination for the electronic display screen 102. The lighting component may be powered using a pulse width modulation signal provided by a power supply, and the duty cycle of this pulse width modulation signal may determine the intensity of the illumination provided by the lighting component (e.g., corresponding to the brightness of the electronic display screen 102). The computing device in this example includes at least one front image capture element 104 and at least one back image capture element 110 positioned on the device such that, with sufficient lenses and/or optics, the user device 100 is able to capture image information in substantially any direction about the computing device. The example user device 100 also includes at least one microphone 106 or other audio capture device capable of capturing audio data, such as words spoken by a user of the device or sounds indicative of an environment in which the device can currently be found.

The example user device 100 also includes at least one position and/or orientation determining element 108. Such an element can include, for example, an accelerometer or gyroscope operable to detect an orientation and/or change in orientation of the user device 100. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 2:
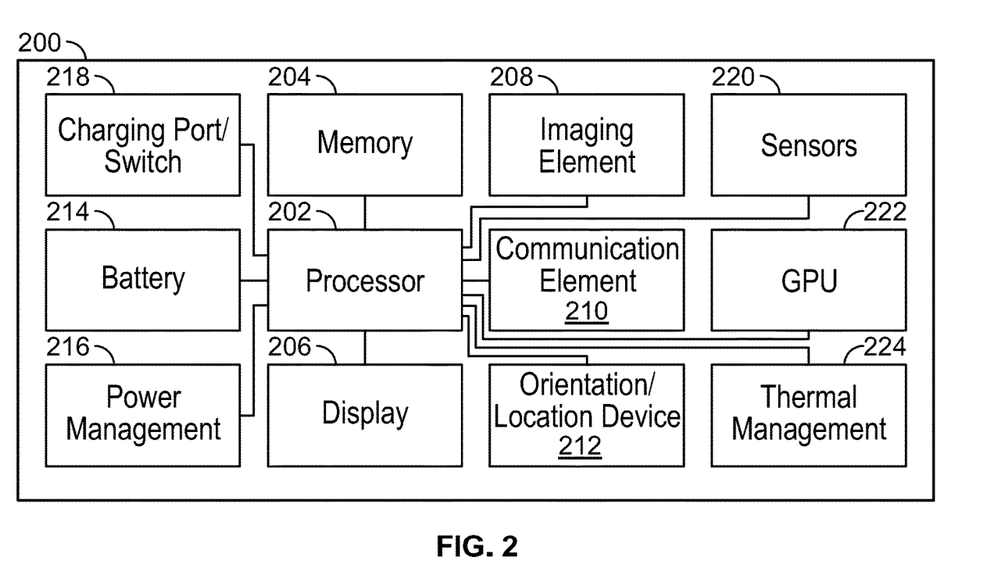
FIG. 2 illustrates example components of an example electronic device that can be used in accordance with various embodiments.

FIG. 2 illustrates a logical arrangement of a set of general components of an example computing device 200 such as the user device 100 described with respect to FIG. 1, which may be a portable electronic device. In this example, the device includes a processor 202 (e.g., which may be part of a controller) for executing instructions that can be stored in a memory device or element 204. As would be apparent to one of ordinary skill in the art, the device can include many types of non-transitory and/or transitory memory, data storage, or non-transitory computer-readable storage media, such as a first data storage for program instructions for execution by the processor 202 (e.g., by the controller), a separate storage for images or data, a removable memory for sharing information with other devices, etc. The device typically will include some type of display element 206, such as a touch screen, a liquid crystal display (LCD), or an electrowetting display, although devices such as portable media players might convey information via other means, such as through audio speakers. The display element 206 may include a lighting component that provides illumination for the display element 206. As discussed, the device in many embodiments will include at least one image capture element 208 such as a camera or infrared sensor that is able to image a user, people, or objects in the vicinity of the device. The device also can include one or more orientation and/or location determining elements 212, such as an accelerometer, gyroscope, electronic compass, or GPS device as discussed above. These elements can be in communication with the processor in order to provide the processor with positioning and/or orientation data.

In some embodiments, the computing device 200 of FIG. 2 can include one or more sideband or other such communication elements (not shown), such as a Wi-Fi, Bluetooth, RF, or another wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The example device 200 also includes a battery 214 or other appropriate power source. The power source can include, for example, at least one rechargeable battery, and can include other elements as well such as solar power cells or other such elements. The device also can include an intelligent charging port or switch 218, in at least some embodiments, which is controllable by the processor 202. The device might be plugged into an outlet or placed into a charging station, for example, but in at least some embodiments the charging switch 218 can control whether or not power is actually passed on to battery 214 for purposes of charging battery 214. For example, if battery 214 has almost no remaining charge then the switch might close in order to allow power to charge battery 214, while in the case of a battery 214 that is nearly fully charged the charging switch 218 might open such that no charge passes to battery 214.

Example device 200 may also include at least one power management module or component 216, which can be implemented in software and/or hardware in communication with, or executed by, at least one processor 202 of the device 200. In at least some embodiments, the power management module 216 can monitor various aspects of the device, and its usage by a user, to determine when to adjust a functional state of at least one component of the device. For example, in response to detecting that real-time (e.g., instantaneous) power usage of device 200 exceeds a predetermined power usage threshold, power management module 216 may reduce the power usage of the device by throttling the performance of one or more power-intensive components of device 200 (e.g., by reducing an operating frequency of processors or by dimming display element 206 of device 200) or by disabling one or more functions of device 200 (e.g., by disabling WiFi, Bluetooth, or global positioning system (GPS) functions of device 200 and components associated with these functions).

Similarly, device 200 may include thermal management module (or component) 224, which can be implemented in software and/or hardware in communication with, or executed by, processor 202 of device 200. In at least some embodiments, the thermal management module 224 can monitor and adjust various aspects of device 200 and its usage by a user to determine when to adjust a functional state of at least one component of the device. For example, in response to detecting that the temperature in a region of device 200 has exceeded a predetermined thermal trip threshold (e.g., a threshold trip temperature) for that region, the thermal management module 224 may reduce the power usage of the device by throttling the performance of one or more heat generating components of device 200 (e.g., by reducing an operating frequency of processors or by dimming the display element 206 of device 200) or by disabling one or more functions of device 200 (e.g., by disabling WiFi, Bluetooth, or global positioning system (GPS) functions of device 200 and components associated with these functions).

The example device 200 also includes a graphics processing unit (GPU) 222. GPUs are specialized processors configured to perform graphics-related operations, and may be used to accelerate rending of 2-dimensional or 3-dimensional graphics and/or to reduce the processing load placed on processor 202. GPUs may be more effective than general purpose processors for performing complex algorithms that may be required for various graphics intensive tasks, such as gaming, due to the highly parallel structure of GPUs. GPU 222 may be a significant source of heat while performing graphics-intensive processing tasks for device 200.

The example device 200 also includes sensors 220, which may include one or more temperature sensors, voltage sensors, and current sensors. Temperature sensors included in sensors 220 may be placed on or near sources of heat in the device, such as the central processing unit (CPU) (e.g., processor 202) of the device, GPU 222, the device display, and battery 214. These temperature sensors each sense temperatures in their respective regions and generate temperature data based on the sensed temperatures over time. The temperature sensors may include thermocouples, thermistors, infrared temperature sensors, resistance temperature detectors, or any other desired type of temperature sensor. Voltage sensors included in sensors 220 may be placed across various components in device 200 to detect voltages across those components, which may include, for example, battery 214, processor 202, and GPU 222. The voltage sensors may produce voltage data that includes these detected voltages. The voltage sensors may include capacitive or resistive type voltage sensors, or any other desired type of voltage sensor. Current sensors included in sensors 220 may be placed at inputs and/or outputs of various components in device 200 to detect currents flowing into or out of those components, which may include, for example, battery 214, processor 202, and GPU 222. The current sensors may include Hall Effect sensors, current clamp sensors, resistor-based current sensors, or any other desired type of current sensor. The temperature data, current data, and voltage data described above may, for example, be converted from analog format to digital format by analog-to-digital conversion circuitry in device 200 before being provided to processor 202.

Figure 3:
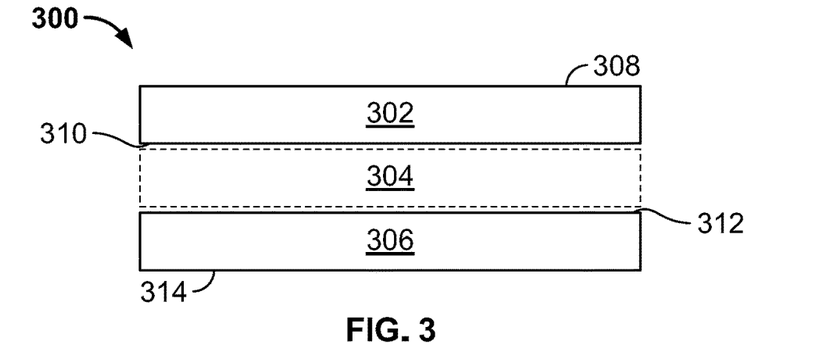
FIG. 3 depicts a battery laminate including an anode layer and a cathode layer.

FIG. 3 depicts a battery laminate including an anode layer and a cathode layer. Laminate 300 is made up of a number of layers of material that may be attached to one another in any suitable manner. In some cases, a non-conductive adhesive may be used to attach the one or more layers of the laminate together. Though in some embodiments, no adhesives or other attachment mechanisms may be required, in which the various layers may simply be pressed against one another or put into proximity with one another. The various layers making up laminate 300 may, in some cases, be at least partially coated with one more materials (e.g., active materials) to enable the operation of a battery or to improve or enhance battery performance.

Battery laminate 300 may include an anode layer 302, a separator layer 304, shown in phantom, and a cathode layer 306. In one implementation, the three layers may be pressed together and folded or rolled into various shapes, as required. FIG. 3 shows a cross-sectional view of a portion of battery laminate 300 including layers 302, 304 and 306. The anode layer 302 may include a top surface 308 (e.g., outer surface) and a bottom surface 310 (e.g., inner surface). The top surface 308 may optionally be coated with an active material, such as LCO, Lithium Nickel Cobalt Manganese Oxide or NCM and/or LFP. The bottom surface 310 may similarly be coated with an active material (e.g., anode active material).

The coated bottom surface 310 of anode layer 302 may be in contact with separator layer 304. Similarly, a top surface 312 (e.g., inner surface) of the cathode layer 306 may be coated with an active material (e.g., cathode active material), such as LCO, Lithium Nickel Cobalt Manganese Oxide or NCM and/or LFP. A bottom surface 314 of cathode layer 306 may optionally be coated with the active material.

The bottom surface 310 of the anode layer 302 that is coated with active material may be separated from the top surface 312 of the cathode layer 306 by the separator layer 304. Generally, separator layer 304 includes a dielectric (i.e., electrically insulating) material that is flexible, enabling laminate 300 to be formed into an appropriate shape.

In this configuration, the portions of cathode layer 306 and anode layer 302 coated with the active material do not come in contact with one another and are instead separated from one another by separator layer 304.

It is important to note that in some configurations of laminate 300, portions of the top surface 308 of the anode layer 302 may come in contact with one or more other top surfaces 308 of the anode layer 302, but these portions are not coated with the active material.

Similarly, portions of the bottom surface 314 (e.g., outer surface) of the cathode layer 306 may come in contact with one or more other bottom surfaces 314 of the cathode layer 306, but, again, these portions are also not coated with the active material. In some implementations, the top portion 308 of the anode layer 302 and the bottom portion 314 of the cathode layer 306 may also be coated with a separator material.

In a typical application example, anode layer 302 may be a copper layer and the cathode layer 306 may be an aluminum layer. In one implementation, separator layer 304 may include a thermoplastic polymer layer.

Using battery laminate 300, a number of different battery configurations can be fabricated. In one example, laminate 300 can be cut into sheets and stacked together to form a stacked battery or, alternatively, laminate 300 can be rolled up into a cylindrical shape to form a batter. Stacking techniques generally stack elements of the battery on top of one another during manufacturing. Wrapping techniques generally wrap elements of the battery around into a roll or cylinder-like structure.

Figure 4A:
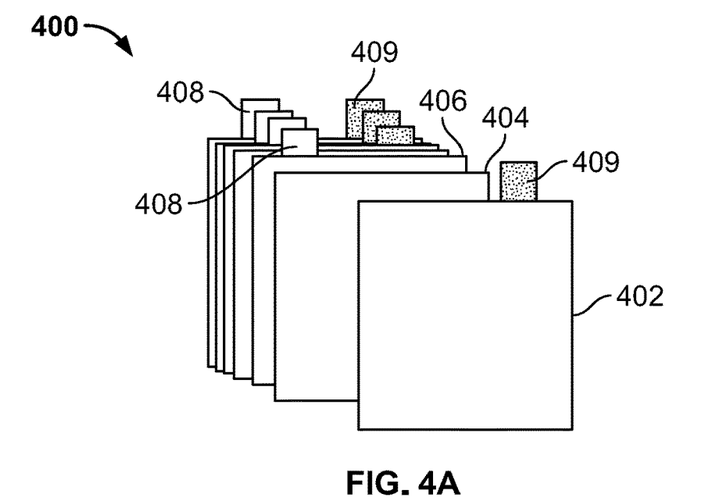
FIG. 4A illustrates a battery manufacturing technique in which sheets of battery laminate are stacked over one another.

FIG. 4A illustrates a battery manufacturing technique using the battery laminate depicted in FIG. 3. To fabricate battery stack 400, laminate 300 of FIG. 3 is cut into a number of sheets, all of the same size. Those sheets can then be stacked into the configuration depicted in FIG. 4A. The view shown in FIG. 4A is partially exploded in that the view depicts layers of the battery stack spread apart from one another to facilitate depiction of the details of battery stack 400.

Generally, stack 400 includes alternating layers of anode 402 and cathode 406. A separator or a separator sheet 404 separates the layers of anode 402 and cathode 406. A second separator sheet is then stacked or placed on the anode 402, followed by a second cathode. The process continues until the stack reaches a desired size.

To enable operation of battery stack 400 to store electrically charge, a number of conductive tabs 408 and 409 are connected to each of the layers of stack 400. Specifically, conductive tabs 408, which include a metal or other electrically conductive material are connected to each sheet of cathode 406. Specifically, because each sheet of cathode 406 includes a layer of conductive material (the cathode collector), at least partially surrounded by active material, it should be noted that conductive tabs 408 are electrically coupled to the cathode collector of each sheet of cathode 406.

Similarly, conductive tabs 409, which include a metal or other electrically conductive material are connected to each sheet of anode 402. Specifically, because each sheet of anode 402 includes a layer of conductive material (the anode collector), at least partially surrounded by active material, it should be noted that conductive tabs 409 are electrically coupled to the anode collector of each sheet of anode 402.

With stacked 400 formed, the anode conductive tabs 409 are each electrically coupled to one another (e.g., by welding, conductive adhesive, or some other suitable mechanism). Similarly, the cathode conductive tabs 408 are each electrically coupled to one another (e.g., by welding, conductive adhesive, or some other suitable mechanism). The anode conductive tabs 409 are electrically isolated (i.e., not electrically coupled) from one another.

Then, to store an electrical charge in stack 400, an electric potential is applied across anode conductive tabs 409 and cathode conductive tabs 408. With an electric potential applied, a chemical reaction occurring within the stack 400's active material causes an electric potential to be stored across each pair of sheets of anode material 402 and cathode material 406 in battery stack 400. That electrical energy can then be delivered into devices connected to battery stack 400.

Typically, to complete manufacturing of a battery using stack 400, stack 400 is positioned within a battery housing or case. The battery housing can provide protection to stack 400 from external forces and materials, preventing damage to stack 400. Additionally, the battery housing can include electrical contacts, enabling the housing to be positioned within a device for providing electrical energy to the device. With stack 400 positioned inside the battery housing, conductive tabs 408 and 409 are then attached to the appropriate electrical contact on the battery's housing, to put those contacts into electrical connection with the battery's anode 402 or cathode 406.

Figure 4B:
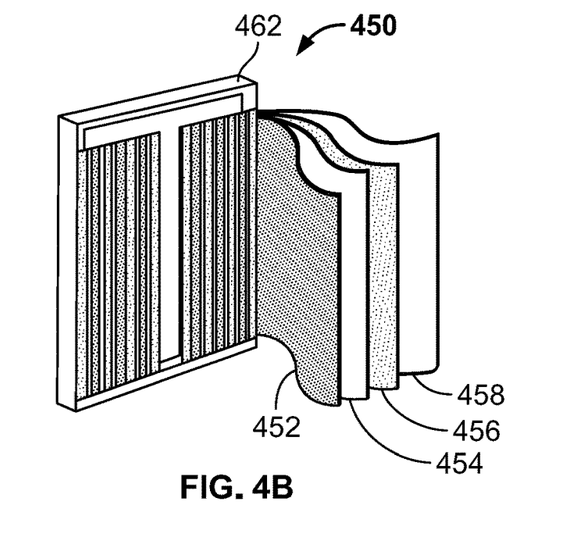
FIG. 4B illustrates a battery manufacturing technique in the battery laminate is rolled into a cylindrical shape.

In some embodiments, rather than cut a battery laminate into sheets to form the stack 400 of FIG. 4A, the laminate (e.g., laminate 300 of FIG. 3) can be rolled or wrapped into a cylindrical or spiral shape 450 as shown in FIG. 4B. FIG. 4B depicts a battery configuration in which the battery laminate has been wrapped or rolled into a cylindrical stack 450. In such an embodiment, battery layers (e.g., cathodes, anodes, separators) are manufactured into a laminate in a contiguous manner. When the layers are wrapped or wound around one or more mandrels, the laminate forms a stack similar to the stack of FIG. 4A.

The cylindrical battery stack 450 includes an anode layer 452 wound around a mandrel or itself. A layer of separator 454 (i.e., a dielectric layer) is wound around the anode layer 452. Finally, cathode layer 456 is wound around the separator 454 and anode layer 452. Finally, a second separator 458 may be wound around the cathode layer 456. The resulting cylindrical stack 450 is in the form of a wound spiral.

Typical, a cylindrical battery stack 450 is formed by first manufacturing a rectangular sheet of battery laminate that includes an anode, a cathode, and a separator that electrically insulates the anode from the cathode.

Figure 5A:
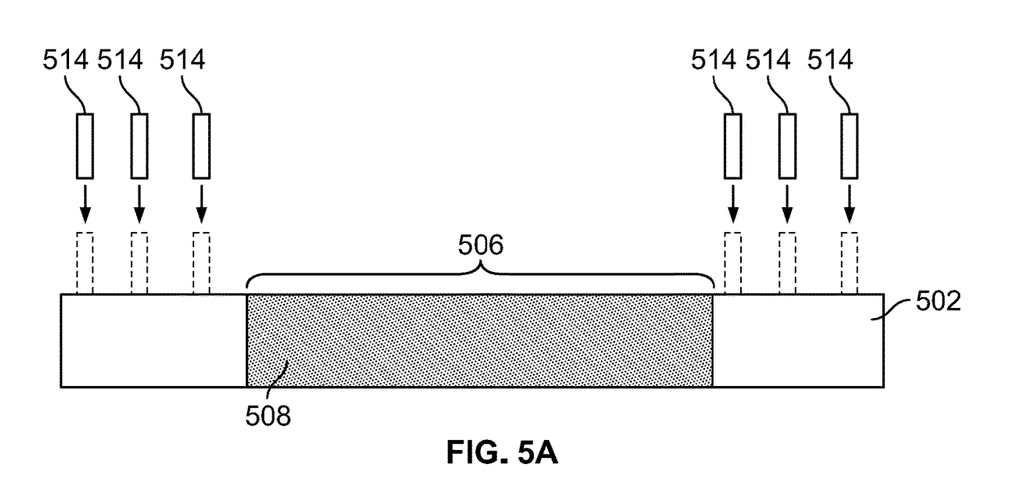
FIGS. 5A-5D depict steps in the fabrication process of a cylindrical battery stack as depicted in FIG. 4B.

FIGS. 5A-5D depict steps in the fabrication process of the cylindrical battery stack 450 depicted in FIG. 4B. In FIG. 5A, anode collector 502 is a sheet of conductive material, such as copper, though other electrically conductive materials may be utilized. Cathode collector 504 is also a sheet of conductive material, such as aluminum, though other electrically conductive materials may be utilized. Generally, anode collector 502 and cathode collector 504 are cut to be of the same length, with the length being selected based upon the desired application. Generally, the length is selected so that, when the battery laminate, as described below, has been rolled into its cylindrical configuration, the rolled laminate will fit within the desired battery housing.

A portion 506 of anode collector 502 is coated with an active material 508, such as LCO, Lithium Nickel Cobalt Manganese Oxide or NCM and/or LFP. As depicted, active material 508 only covers a portion of anode collector 502. The other portions of anode collector 502 are uncoated with the base conductive material being left exposed. Portions of anode collector 502 are uncoated with active material to enable a number of conductive tabs 514 to be attached directly to anode collector 502. Conductive tabs 514 include a conductive material, such as metal. In an embodiment, conductive tabs 514 are formed from the same material as anode collector 502 (e.g., copper). Conductive tabs 514 are attached the uncoated portions of anode collector 502, typically at the ends of anode collector 502. In an embodiment, conductive tabs 514 may be welded to the uncoated portions of anode collector 502.

Figure 5B:
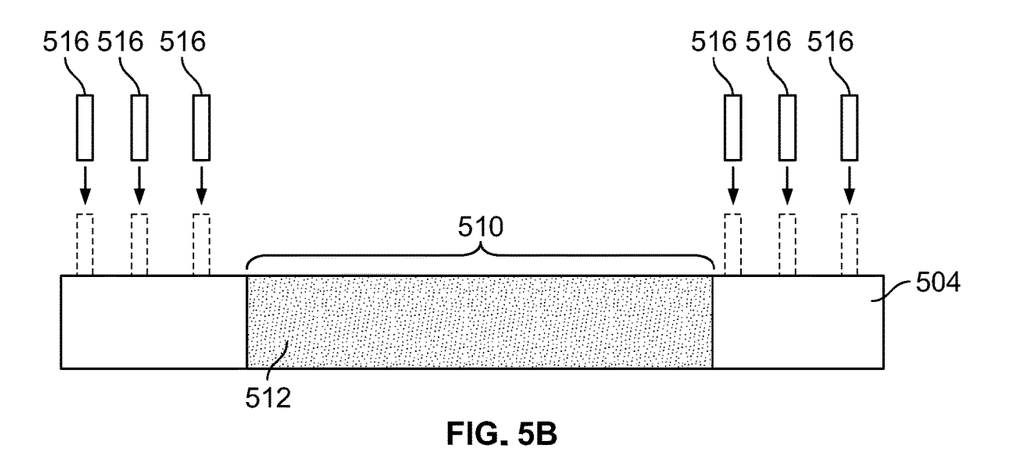

Similarly, as depicted in FIG. 5B, a portion 510 of cathode collector 504 is coated with an active material 512, such as LCO, Lithium Nickel Cobalt Manganese Oxide or NCM and/or LFP. As depicted, active material 512 only covers a portion of cathode collector 504. The other portions of cathode collector 504 are uncoated with the conductive material of cathode collector 504 being left exposed. Portions of cathode collector 504 are uncoated with active material to enable a number of conductive tabs 516 to be attached directly to cathode collector 504. Conductive tabs 516 include a conductive material, such as metal. In an embodiment, conductive tabs 516 are formed from the same material as cathode collector 504 (e.g., aluminum). Conductive tabs 516 are attached the uncoated portions of cathode collector 504. In an embodiment, conductive tabs 516 may be welded to the uncoated portions of cathode collector 504.

Figure 5C:
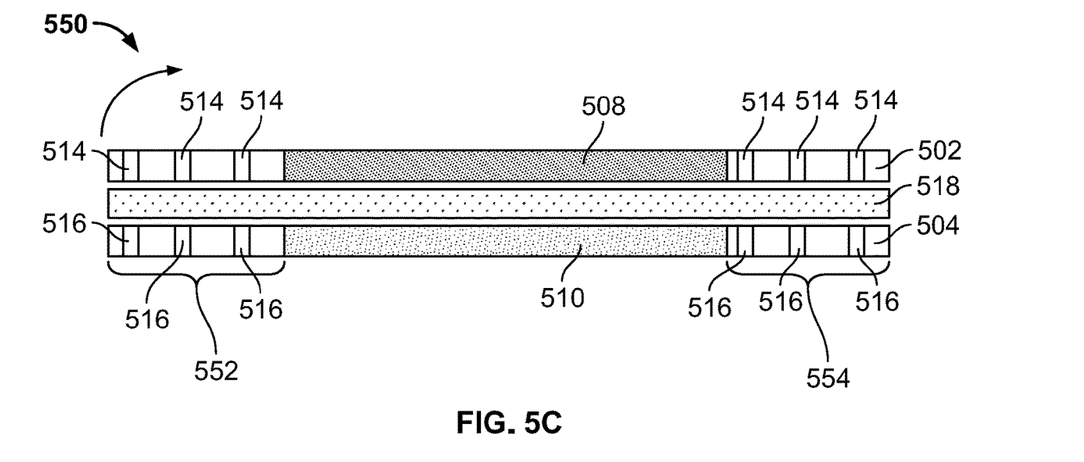

With each of the anode collector 502 and cathode collector 504 at last partially covered in active material and with affixed conductive tabs, a battery laminate is formed. FIG. 5C depicts battery laminate 550. FIG. 5C depicts a view of an edge of laminate 550, as opposed to depicting a front face of the laminate (FIGS. 5A and 5B shows the front faces of anode collector 502 and cathode collector 504, respectively).

To form laminate 550, anode collector 502 is positioned over cathode collector 504. Separator 518, which may include a thermoplastic polymer, is positioned between anode collector 502 and cathode collector 504 to electrically isolate anode collector 502 and cathode collector 504.

The layers making up laminate 550 may be fixed to one another using any suitable approach. In an embodiment, a non-conductive adhesive may be used to attach one or more layers of laminate 550 together. Though in some embodiments, no adhesives or other attachment mechanisms may be required, in which the various layers of laminate 550 may simply be pressed against one another or put into proximity with one another.

When laminate 550 is operational, electric charge or potential builds up across the regions of anode collector 502 and cathode collector 504 over which active material has been formed. Accordingly, with reference to FIG. 5C, only those portions of anode collector 502 over which active material 508 is formed that overlap portions of cathode collector 504 over which active material 510 has been formed will contribute to the electrical charge storing capacity of the battery formed from laminate 550.

Consequently, those regions of anode collector 502 and cathode collector 504 that are not covered in active material do not contribute to the charge-storing capacity of a battery fabricated using laminate 550. Specifically, regions 552 and 554 of laminate 550 (including those regions of laminate 550 to which conductive tabs 514 and 516 are affixed) do not contribute to the battery's capacity and instead represent dead weight—essentially regions of the battery that are not functional and increase the battery's size and weight. With laminate 550 formed, laminate 550 is rolled into a cylindrical shape (such as that of battery stack 450 depicted in FIG. 4B).

Figure 5D:
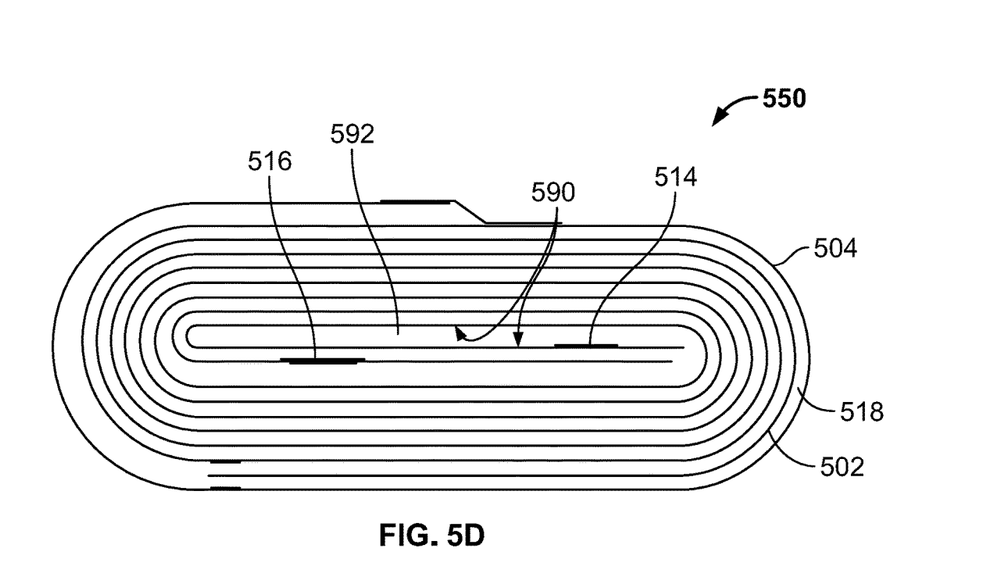

FIG. 5D depicts laminate 550 rolled into a cylindrical shape. FIG. 5D is a simplified view in that it shows each of anode collector 502 and cathode collector 504, but does not separately depict the active material formed thereover. When winding laminate 550, laminate 550 is typically wound around structure, such as a mandrel. The structure provides support to laminate 550 during the winding process and assist in controlling the shape and configuration of laminate 550. But after laminate 550 has been wound around the mandrel (and, optionally, the mandrel remove from the wound battery stack), the region of the wound stack occupied by the mandrel represents dead space that is not used to store electrical charge. Additionally, the inner surface 590 of the active material of anode collector 502 is positioned directly on either side of the central volume 592 that would have been occupied by the mandrel. The mandrel does not include active material and so the inner surface 590 of the active material of anode collector 502 simply faces the other inner surface 590 of the active material of anode collector 502 and is not proximate the active material of cathode collector 504 and so does not contribute to the charge-storing capability of the battery. This in turn, increases the size of the resulting battery without providing a corresponding increase in battery capacity.

In the present battery design, the battery's anode collector and cathode collector are each patterned into shapes that include conductive tabs. Because the anode and cathode collectors are patterned to include the conductive tabs, the process of manufacturing the battery does not require the additional step of welding (or otherwise fixing) conductive tabs to each of the anode collector and cathode collector. Consequently, there is no requirement that regions of both the anode collector and cathode collector be uncovered in active material to facilitate the welding process. This in turn, can increase the surface areas of the anode collector and cathode collector that are coated with active materials which, in turn, can increase the capacity of the battery and reduce amounts of unproductive anode and cathode collector material.

After forming a laminate including the present anode collector, cathode collector, and a separator between the anode collector and cathode collector, an alternative winding configuration is presented. Specifically, the anode and cathode layers are offset from one another by one panel in the battery's laminate. As such, at one end of the laminate, the anode material protrudes by one panel, and at the other end of the laminate, the cathode material protrudes. This enables, at the first end of the laminate, the anode material to be wrapped around the end of the cathode material. Similarly, at the second end of the laminate, the cathode material can be wrapped around the end of the anode material. This, in turn, maximizes the surface area of each of the anode and cathode that is both covered in active material and positioned opposite active material of the opposite type. This also, in turn, increases the capacitance of the battery. With the laminate so formed, the laminate can be rolled or folded into a cylindrical or spiral configuration and installed into a suitable housing. The conductive tabs, which are not covered in active material, can then be attached to appropriate electrical contact on the battery's housing, to put those contacts into electrical connection with the battery's anode or cathode.

Figure 6:
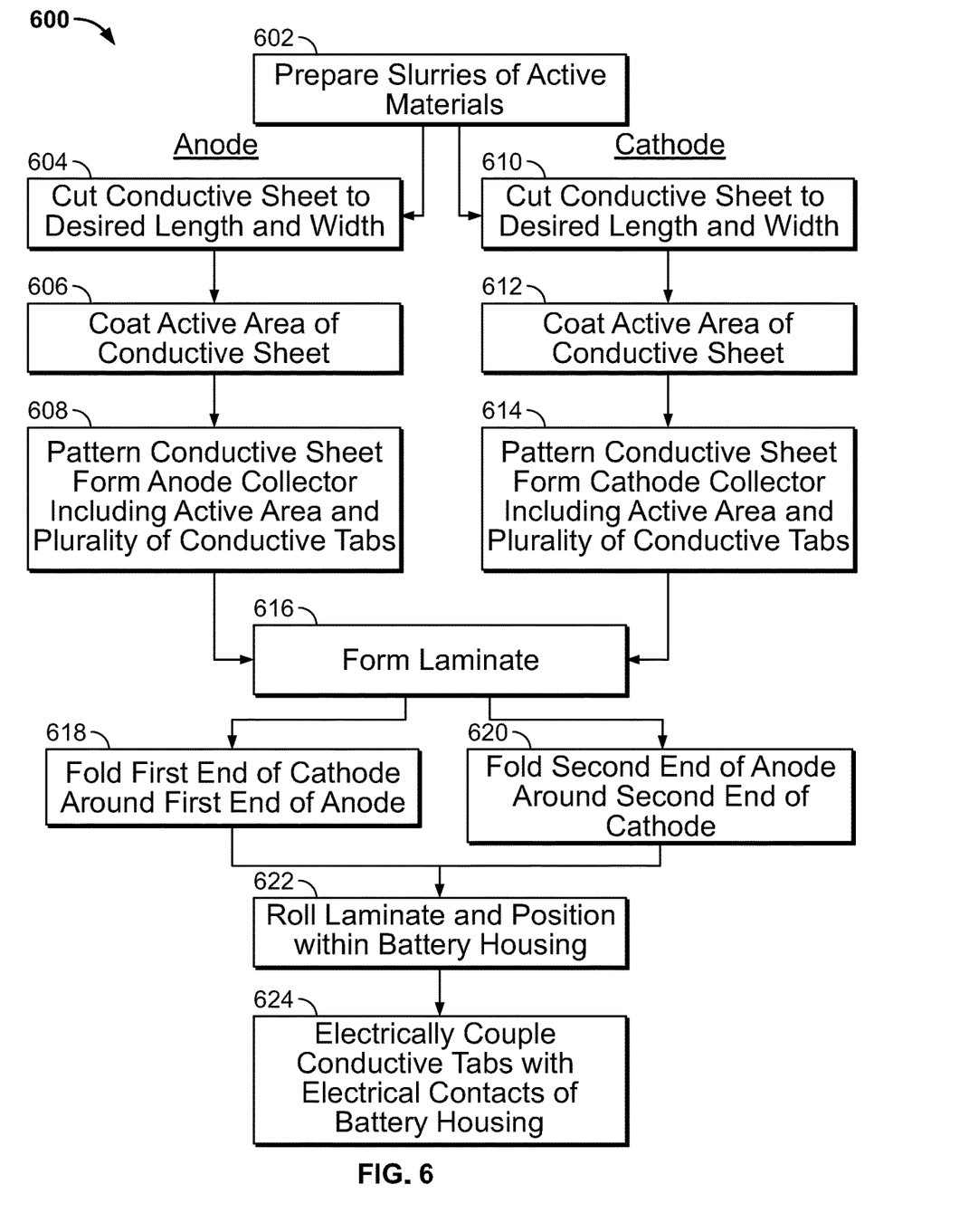
FIG. 6 is a flowchart depicting a method of manufacturing a battery including a laminate structure in accordance with the present disclosure.

FIG. 6 is a flowchart depicting a method of manufacturing a battery including a laminate structure in accordance with the present disclosure. FIGS. 7A-7F depicts steps of the method of FIG. 6.

Referring to FIG. 6, in a first step 602 of method 600, a slurry of active materials for the battery's anode and cathode are prepared. The slurries are typically semi-liquid mixtures that can include, for the anode, graphite, silicon, or graphite-silicon composite and, for the cathode, LCO, Lithium Nickel Cobalt Manganese Oxide or NCM and/or LFP or combinations thereof.

With the slurries prepared, method 600 divides into two branches, with a first branch beginning with step 604 relating to the construction of an anode structure for the battery and a second branch beginning with step 606 relating to the construction of an anode structure for the battery. The two branches may be performed simultaneously or sequentially, in any order.

In step 604, a sheet of conductive material is cut to a desired length and width (see sheet 702 of FIG. 7A) to form a current collector. In this example, sheet 702 is to be manufactured into the anode collector of the battery and so the conductive material may include copper or some other suitable conductive material. Typically, the length of sheet 702 is selected based upon the ultimate application and size of the battery (i.e., the battery housing). Specifically, the length L of sheet 702 is selected so that, when sheet 702 is processed as described below, sheet 702 can be formed into a laminate with other components of the battery, rolled into a cylindrical shape and installed within the desired battery housing. In a typical application, sheet 702 may have a length of about 1 meter and a width of about 15 centimeters (cm), where the width includes 10-12 cm for the active area (Wa) and an additional 2-3 cm from which the conductive tabs will be formed (Wt). In general, however, the size of sheet 702 may vary significantly based upon the ultimate application of the battery.

Figure 7A:
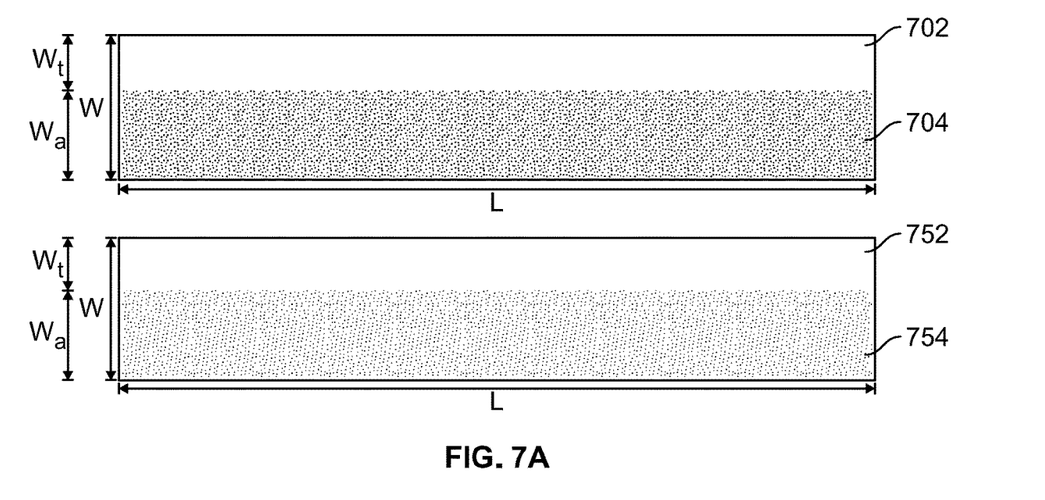
FIGS. 7A-7F depicts steps of the method of FIG. 6.

The width W of sheet 702 is similarly selected based upon the ultimate application and design of the battery. Specifically, the width W of sheet 702 is selected to include a width Wa that defines an active area of sheet 702 in combination with length L (described below), as well as a width Wt of sheet 702 from which conductive tabs will be cut or patterned (described below). The active area of sheet 702 defines a geometrical region of sheet 702 defined as the region having width Wa and length L over which the active material of the anode is deposited or coated.

With sheet 702 of conductive material cut to a desired length L and width W, the appropriate active material is coated over an active area of sheet 702 in step 606. In this example, as sheet 702 is being manufactured into the battery's anode collector, the active material may include graphite, silicon, or graphite-silicon composite.

Sheet 702 may be coated in active material 704 using any suitable active material deposition process, such as a roll-to-roll coating, which may utilize slot die coating to deposit active material 704 in the form of a slurry over sheet 702. When depositing active material 704, only the active region of sheet 702 is covered. The active region of sheet 702 runs along the length of sheet 702, but only has a width of Wa (as designated in FIG. 7A). Accordingly, after coating sheet 702 in active material 704, only a portion of sheet 702 is coated in active material 704. The top portion of sheet 702 (as depicted in FIG. 7A) that has a width of Wt, is not covered in active material 704. As described below, this uncovered portion of sheet 702 is used to fabricate a number of conductive tabs that are not themselves covered in active material 704.

When depositing active material 704, the deposition process may mask, cover, or otherwise protect the region of sheet 702 that is not to be covered in active material 704. If depositing active material 704 by slot die casting, a typical masking approach may be utilized to control the deposition of active material 704 onto sheet 702 to prevent active material being deposited upon or formed over the region of sheet 702 from which conductive tabs will be patterned.

Figure 7B:
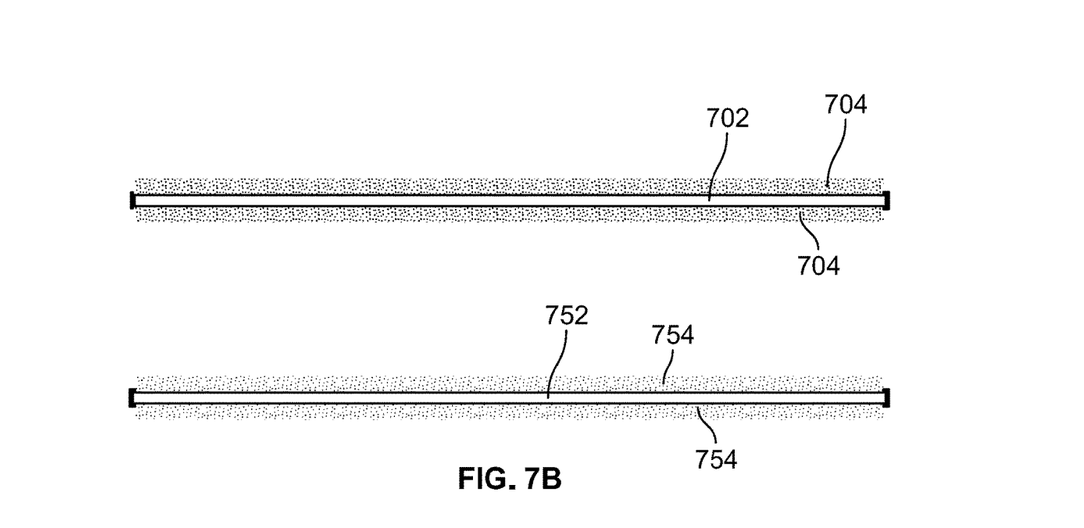

When depositing active material 704, active material 704 may be formed over both the front surface and back surface (opposite the front surface) of sheet 702. With reference to FIG. 7A, for example, active material 704 is depicted on the front surface of sheet 702, but may be formed over the back surface of sheet 702 in the same shape and position. To illustrate, FIG. 7B depicts a top view of sheet 702 depicted in FIG. 7A to show active material 704 formed over the front and back surfaces of conductive sheet 702. In that case, the front and back surfaces of the top portion of sheet 702 (having a width Wt) would not have any applied active material 704. In an embodiment, the entire front surface and the entire back surface of the region of sheet 702 is coated or covered in active material. In an embodiment, the entire front and back surface of the active area of conductive sheet 702 (i.e., the entire area of conductive sheet 702 excluding the portion that will be patterned into conductive tabs, as described below) is coated in active material. As such, a region of the front surface of conductive sheet 702 having width Wa and length L is coated in active material and a region of the back surface of conductive sheet 702 having width Wa and length L is also coated in active material.

Figure 7C:
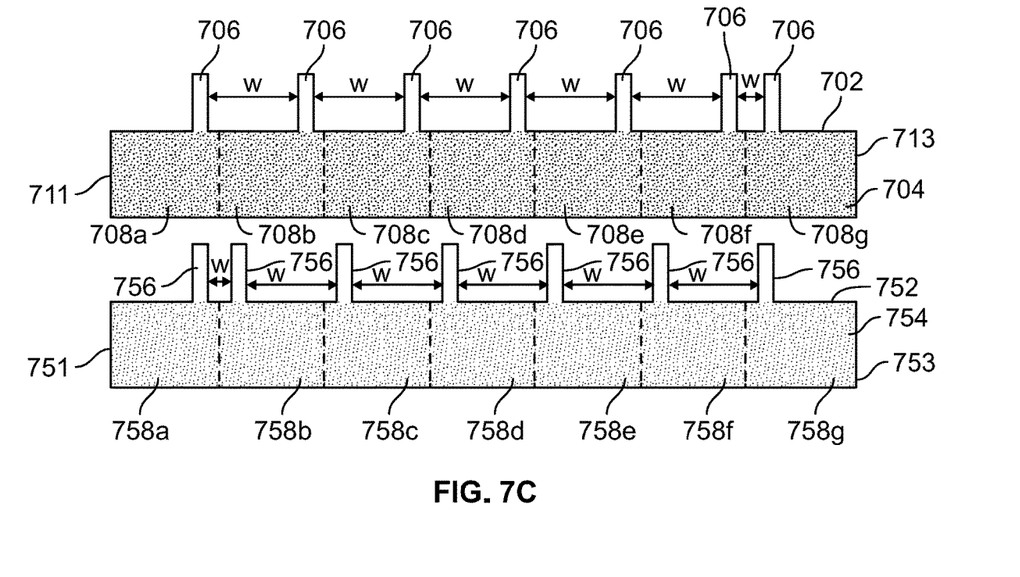

With active material 704 deposited, in step 608, sheet 702 is patterned to form a number of conductive tabs 706 (see FIG. 7C). Specifically, portions of the region of sheet 702 within width Wt are removed to leave intact conductive tabs 706. Sheet 702 may be patterned using any suitable process that involves cutting or otherwise remove material from sheet 702, such as mechanically cutting or tearing, laser cutting, and the like. In various applications, a typical width of the individual conductive tabs 706 may be from 5 to 6 millimeters (mm), though thicker or thinner conductive tabs 706 may be used in different applications.

With sheet 702 at least partially covered in active material 704 and patterned to include conductive tabs 706, the resulting structure can operate as a current collector (and, specifically, an anode collector) for a battery, where the anode collector is covered in active material and includes a plurality of conductive tabs enabling electrical coupling between the anode collector and external circuitry.

In the configuration depicted in FIG. 7C, sheet 702 (now referred to as anode 702) includes a plurality of regions (referred to as panels or panel regions) 708a-708g. Because anode 702 was fabricated from a single sheet of conductive material, panel regions 708a-708g are each integral with one another (that is, they are not joined together as part of the fabrication process but instead merely represent geometrical regions of the original sheet 702). Anode 702 can be patterned so that each panel region 708a-708g includes a conductive tab 706 enabling that designated panel region 708a-708g to be connected to an external electrical component or terminal. In contrast to conventional battery anodes (in which conductive tabs may only be connected to the collectors at the very edges of the collectors), the incorporation of conductive tabs 706 into each panel region 708a-708g may provide more efficient (that is, lower impedance)

power transfer into an out of the active material 704 of anode collector 702 because current is being transferred into or out of the active material 704 of anode collector 702 evenly through the entire area of active material 704.

In a separate sequence of steps, the battery's cathode is fabricated. In step 610, a second sheet of conductive material is cut to a desired length and width (see sheet 752 of FIG. 7A). In this example, sheet 752 is to be manufactured into the cathode collector of the battery and so the conductive material may include aluminum or some other suitable conductive material. Typically, the length of sheet 752 is selected based upon the ultimate application and size of the battery (i.e., the battery housing). Specifically, the length L of sheet 752 is selected so that, when sheet 752 is processed as described below, sheet 752 can be formed into a laminate with other components of the battery, rolled into a cylindrical shape and installed within the desired battery housing. In embodiments sheet 752 may have a similar geometrical configuration to that of sheet 702 described above.

The width W of sheet 752 is similarly selected based upon the ultimate application and design of the battery. Specifically, the width W of sheet 752 is selected to include a width Wa of an active area of sheet 752 (described below) in combination with length L, as well as a width Wt of sheet 752 from which conductive tabs will be patterned (described below). The active area of sheet 752 defines a geometrical region of sheet 752 over which the active material of the anode will be deposited. As such, the active area (defined as the region having width Wa and length L) is suitably configured for receiving an application of an active material.

With sheet 752 of conductive material cut to a desired length and width, the appropriate active material is coated over an active area of sheet 752 in step 612. In this example, as sheet 752 is being manufactured into the battery's cathode collector, the active material may include LCO, Lithium Nickel Cobalt Manganese Oxide or NCM and/or LFP.

Sheet 752 may be coated in active material 754 using any suitable active material deposition process, such as a roll-to-roll coating, which may utilize slot die coating to deposit active material 754 (in the form of a slurry) over sheet 752. When depositing active material 754, only the active region of sheet 752 is covered. The active region of sheet 752 runs along the length of sheet 752, but only has a width of Wa (as designated in FIG. 7A). Accordingly, after coating sheet 752 in active material 754, only a portion of sheet 752 is covered in active material 754. The top portion of sheet 752 (as depicted in FIG. 7A) that has a width of Wt, is not covered in active material 754. As described below, this uncovered portion of sheet 752 is used to fabricate a number of conductive tabs that are not themselves covered in active material 754.

When depositing active material 754, the deposition process may mask, cover, or otherwise protect the region of sheet 752 that is not to be covered in active material 754. If depositing active material 754 by slot die casting, a typical masking approach may be utilized to control the deposition of active material 754 onto sheet 752.

When depositing active material 754, active material 754 may be formed over both the front surface and back surface of sheet 752. With reference to FIG. 7A, for example, active material 754 is depicted on the front surface of sheet 752, but may be formed over the back surface of sheet 752 in the same shape and position. In that case, the front and back surfaces of the top portion of sheet 752 (having a width Wt) would not have any applied active material 754. In an embodiment, the entire front surface and back surface of the active region (i.e., the entire area of conductive sheet 752 excluding the portion that will be patterned into conductive tabs, as described below) of sheet 752 (having a length L and width Wa) is coated or covered in active material. To illustrate, FIG. 7B depicts a top view of sheet 752 depicted in FIG. 7A to show active material 754 being formed over the front and back surfaces of conductive sheet 752. In an embodiment, the entire front and back surface of the active area of conductive sheet 752 is coated in active material. As such, a region of the front surface of conductive sheet 752 having width Wa and length L is coated in active material and a region of the back surface of conductive sheet 752 having width Wa and length L is also coated in active material With active material 754 deposited, in step 614, sheet 752 is patterned to form a number of conductive tabs 756 (see FIG. 7C). In an embodiment, sheet 752 is patterned so that the placement on conductive tabs 756 is a mirror image of the placement of conductive tabs 756 on patterned sheet 752. To pattern sheet 752, portions of the region of sheet 752 within width Wt are removed to leave intact conductive tabs 756. Sheet 752 may be patterned using any suitable process that involves cutting or otherwise remove material from sheet 752, such as mechanically cutting or tearing, laser cutting, and the like. In various applications, a typical width of the individual conductive tabs 756 may be from 5 to 6 millimeters (mm), though thicker or thinner conductive tabs 756 may be used in different applications.

With sheet 752 at least partially covered in active material 754 and patterned to include conductive tabs 756, the resulting structure can operate as a current collector (and, specifically, a cathode collector) for a battery, where the cathode is covered in active material and includes a plurality of conductive tabs enabling electrical coupling between the cathode and external circuitry.

In the configuration depicted in FIG. 7C, sheet 752 (not referred to as cathode 752) includes a plurality of regions (referred to as panels or panel regions) 758a-758g. Because cathode 752 was fabricated from a single sheet of conductive material, panel regions 758a-758g are each integral or integrally formed with one another (that is, they are not joined together as part of the fabrication process). Cathode 752 can be patterned so that each panel region 758a-758g includes a conductive tab 706 enabling that designated panel region 758a-758g to be connected to an external component. In contrast to conventional battery collectors (in which conductive tabs may only be connected to the collectors at the very edges of the collectors), the incorporation of conductive tabs 756 into each panel region 758a-758g may provide more efficient (that is, lower impedance) power transfer into an out of the active material 754 of cathode 752.

Both anode 702 and cathode 752 may include any number of panels, each with any number of connected conductive tabs (or particularly panels may not include a conductive tab). The various panels may have any suitable shape depending on the ultimate design requirements of the battery. In some cases, the panels on both anode 702 and cathode 752 may each be the same size, or sometimes panels on the anode 702 and cathode 752 may have different sizes. Anode 702 and cathode 752 may each have a different number of panels.

In an embodiment where anode 702 and cathode 752 are to be formed into a laminate and rolled into a spiral or cylindrical configuration, the dimensions of each the panels on both anode 702 and cathode 752 may gradually change along the length of the anode 702 and cathode 752. This change in dimension may compensate, for example, for a growing size of the spiral structure as the laminate is wound into a spiral configuration. In such an implementation, For example, with reference to FIG. 7C, if the panels 708a and 758a are to be wound into the center of a spiral structure, whereas panels 708g and 758g would be to the outside of that spiral structure, panels 708a and 758a may be narrower than panels 708g and 758g because panels 708g and 758g would need to be sufficiently wide to wrap around the outside of the spiral, a further distance, than the interior of the spiral that must be spanned by 708a and 758a. Accordingly, in that configuration, moving from panel 708a towards panel 708g and panel 758a toward panel 758g, the width of panels 708 and 758 may gradually increase. In a similar manner, the distance between adjacent conductive tabs 706 and 756 ('w') may gradually increase moving from left-to-right in FIG. 7C to compensate for the changing widths of panels 708 and 758. In an embodiment, for example, the distance between adjacent conductive tabs 706 and 756 could increase by about 2-5% moving from first ends 711 and 751 of anode 702 and cathode 752 towards the second ends 713 and 753, where the first ends 711 and 751 would be located towards the center of the cylindrical structure when the laminate is rolled and second ends 713 and 753 would located toward the outside of the resulting cylindrical structure. In such an example, adjacent conductive tabs 706 and 756 are a pair of conductive tabs 706 and 756 with no conductive tab 706 and 756 located between the pair of conductive tabs 706 and 756. By adjusting the spacing of the conductive tabs 706 and 756 in this manner, the conductive tabs 706 and 756 may be configured to line-up with one another when laminate 780 is rolled or folded into a spiral configuration (see, for example, the conductive tab configuration depicted FIG. 7F) to facilitate the electrical coupling of conductive tabs 706 and 756 to external components, such as battery terminals.

Figure 7D:
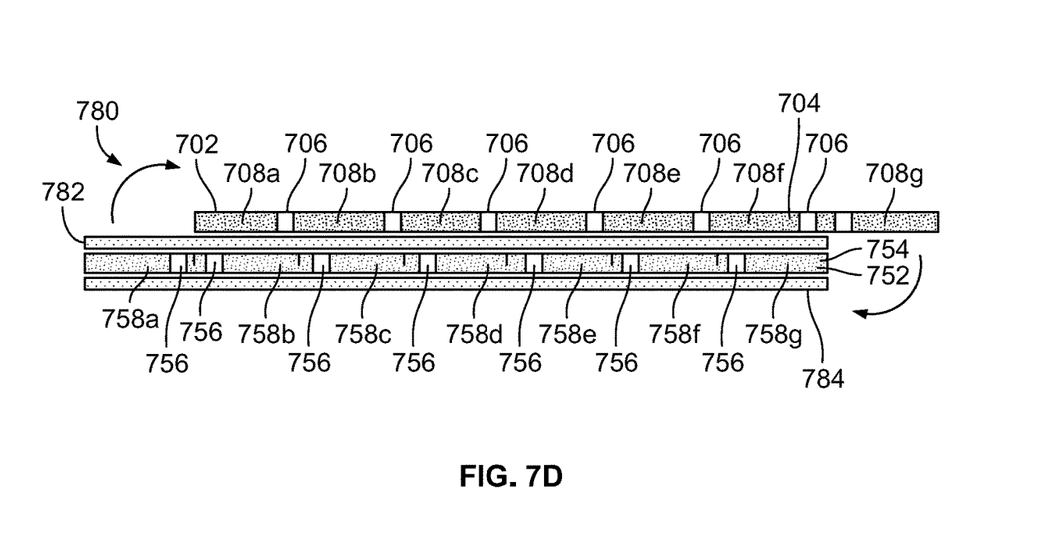

With anode 702 and cathode 752 formed, in step 616 a battery laminate is fabricated. FIG. 7D depicts a top view of laminate 780 in which the views of anode 702 and cathode 752 correspond to a view taken from the top of each of anode 702 and cathode 752 as they are shown in FIG. 7C. To form laminate 780, anode 702 is positioned over cathode 752. As shown in FIG. 7D, separator 782 is positioned between anode 702 cathode 752. In an embodiment, separator 782 may only be positioned between the active areas of anode 702 cathode 752 and separator 782 may not be positioned between conductive tabs 706 and 756, respectively, of anode 702 cathode 752.

In an embodiment, separator 782 is attached to a first surface of cathode 752 and anode 702 is then attached to separator 782. As depicted in FIG. 7D, when forming laminate 780, anode 702 and cathode 752 are offset from one another. Specifically, in an embodiment, anode 702 and cathode 752 are offset from one another by one panel 708 and panel 758. As such, in laminate 780 depicted in FIG. 7D, anode 702 does not extend all the way to far left, or first end, of laminate 780 and cathode 752 does not extend all the way to the far right, or second end, of laminate 780.

A second separator 784 is attached to the back surface of cathode 752. Separators 782 and 784 each include a dielectric material, such as thermoplastic polymer layer.

The various layers (including anode 702, cathode 752, separator 782 and separator 784) of laminate 780 may be connected to one another using any suitable technique or mechanism. In an embodiment, a non-conductive adhesive may be utilized to attach one or more of the layer of laminate 780 together. In other embodiments, the active material deposited over each collector may be adhesive or include an adhesive binder, such as polyvinylidene difluoride (PVDF).

In that case, the layers of laminate 780 may be pressed against one another to form laminate 780.

Figure 7E:
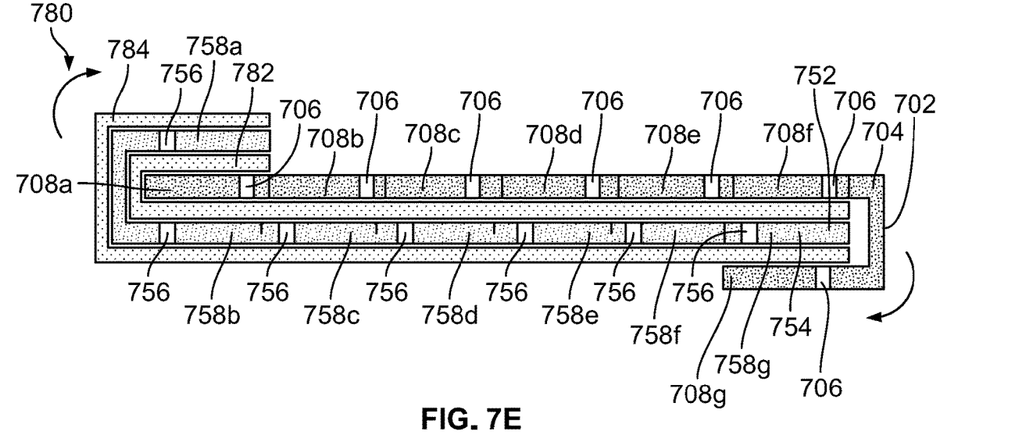

After laminate 780 is formed, each end of laminate 780 is folded over, as described below. These steps are depicted in FIG. 7E. In step 618, the first end of cathode 752 (including panel 758a) is folded around the first end of anode 702 (including panel 708a). As part of the folding process, both separators 782 and 784 are bent in order to also fold around the first end of anode 702 because separators 782 and 784 are each attached to cathode 752.

In this configuration, active material 754 of panels 758a and 758b of cathode 752 is positioned on either side of active material 704 of panel 708a of anode 702. Note that panels 758a and 758b of cathode 752 are adjacent to or directly connected to one another with no intervening panel 758, with panel 758a on or facing a first side of anode 702 and panel 758b is on or facing a second side of anode 702, where the second side is opposite the first side. As such, an electric charge can be stored across the boundaries formed by both panels 758a and 758b of cathode 752 in combination with panel 708a of anode 702.

In step 620, the second end of anode 702 (including panel 708g) is folded around the second end of cathode 752 (including panel 758g). In this configuration, active material 704 of panels 708f and 708g of anode 702 is positioned on either side of active material 754 of panel 758g of cathode 752. Note that panels 708f and 708g of anode 702 are adjacent to one another with no intervening panel 708, with panel 708f on or facing a first side of cathode 752 and panel 708g is on or facing a second side of cathode 752, where the second side is opposite the first side. As such, an electric charge can be stored across the boundaries formed by both panels 708f and 708g of anode 702 and panel 758g of cathode 752.

Figure 7F:
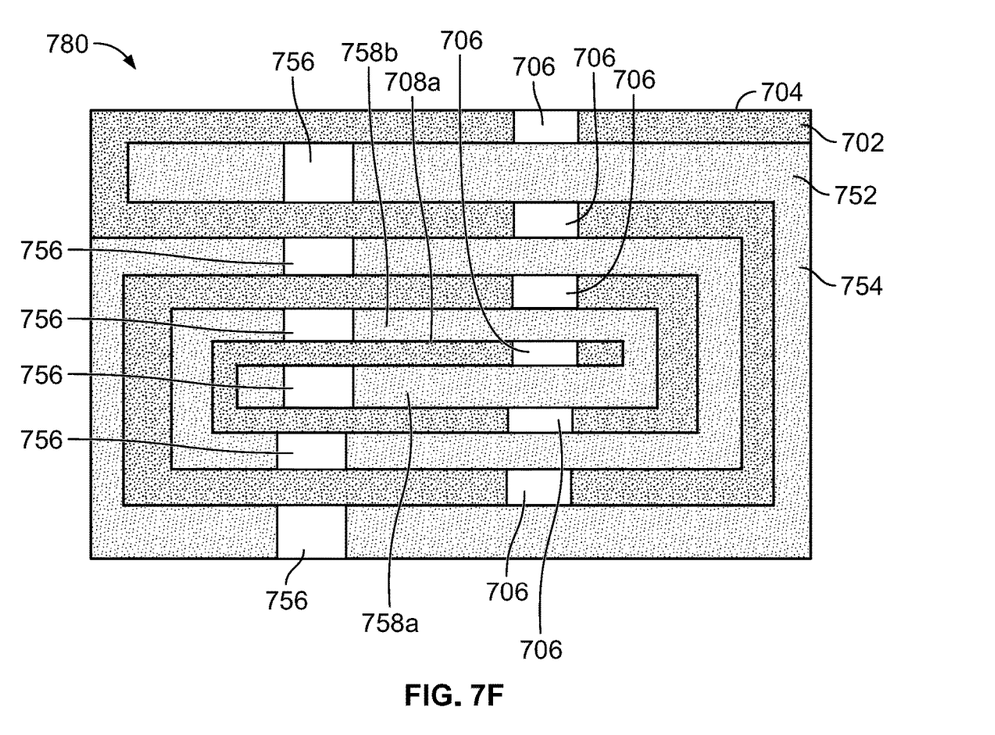

In step 622, laminate 780 is rolled or folded into a cylindrical structure, as depicted in FIG. 7F. To simplify the view of the rolled laminate 780, FIG. 7F shows a simplified view of laminate 780 that does not depict the separators disposed between anode 702 and cathode 752. As depicted, at the center of the rolled laminate, panel 708a of anode 702 is surrounded, on both sides by cathode 752 material and, specifically, panels 758a and 758b of cathode 752. The laminate 780 configuration depicted in FIG. 7F, in which the ends of the anode 702 and cathode 752 are folded, respectively, over the opposite ends of cathode 752 and anode 702 can reduce the inefficiencies resulting from having an interior surface of the laminate that includes non-charge-storing active material (as is observed with inner surface 590 of the active material of anode collector 502 in the laminate roll configuration described above with respect to FIG. 5D).

With laminate 780 rolled, in step 624 the rolled laminate 780 may be positioned within a battery housing (e.g., battery housing 462 of FIG. 4B). In step 624, conductive tabs 706 can then be welded (or otherwise electrically coupled) to one another and connected to a first electrical contact of the battery housing to connect anode 702 to the first electrical contact. Similarly, conductive tabs 756 can then be welded (or otherwise electrically coupled) to one another and connected to a second electrical contact of the battery housing to connect cathode 752 to the second electrical contact.

It is to be noted that in the embodiment described herein, the designation anode or cathode are used merely the purpose of explaining the structure of the present battery configuration. In various embodiments, the anode and cathode structures may be reversed, as known in the art, by applying different active material to the relevant structures. In some cases, each of the anode and the cathode may be referred to as electrodes, in which the electrode includes a current collector and has active material at least partially formed thereover.

In an embodiment, a battery includes a housing including a first electrical contact and a second electrical contact and a laminate in the housing. The laminate includes an anode having a first end and an opposing second end. The anode includes an anode collector including a first sheet of conductive material patterned to include a first active area for receiving an application of active material and a first plurality of conductive tabs formed integrally with the first active area, and a first active material on the first active area of the anode collector. The first active material is not on the first plurality of conductive tabs. The laminate includes a cathode having a first end and an opposing second end. The cathode includes a cathode collector including a second sheet of conductive material patterned to include a second active area for receiving an application of active material and a second plurality of conductive tabs formed integrally with the second active area, and a second active material on the second active area of the cathode collector. The second active material is not on the second plurality of conductive tabs. The battery includes a separator including a dielectric material between the anode collector and the cathode collector. Each conductive tab in the first plurality of conductive tabs is electrically coupled to the first electrical contact of the housing and each conductive tab in the second plurality of conductive tabs is electrically coupled to the second electrical contact of the housing.

In an embodiment, a device includes a housing and a laminate disposed in the housing. The laminate includes a first current collector having a first end and an opposing second end, a separator including a dielectric material, the separator being attached to the first current collector, and a second current collector having a first end and an opposing second end. The second current collector is attached to the separator. A first end of the first current collector is folded around a first end of the second current collector, and a second end of the second current collector is folded around a second end of the first current collector.

In an embodiment, a device includes a housing and a laminate disposed in the housing. The laminate includes a first current collector having a first end and an opposing second end and a second current collector having a first end and an opposing second end. A first end of the first current collector is folded around a first end of the second current collector. The device includes a separator including a dielectric material. At least a portion of the separator is between the first current collector and the second current collector.

It should be understood that the processes, operations, and functionality described above may be performed by or implemented in or by a plurality of systems. For example, the processes, operations, and functionality above may be implemented in batteries, battery powered electronic devices, remote management systems, computing entities, and/or the like. The processes, operations, and functionality may be applied to batteries during operation and/or manufacturing.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A battery, comprising:
a housing including a first electrical contact and a second electrical contact; and
a laminate in the housing, the laminate including:
an anode having a first end and an opposing second end, the anode including:
an anode collector including a first sheet of conductive material patterned to include a first active area for receiving an application of active material and a first plurality of conductive tabs formed integrally with the first active area, and
a first active material on the first active area of the anode collector, the first active material not being on the first plurality of conductive tabs, wherein the anode is subdivided into a first plurality of panel regions and each panel region of the first plurality of panel regions includes only one of the conductive tabs of the first plurality of conductive tabs,
a cathode having a first end and an opposing second end, the cathode including:
a cathode collector including a second sheet of conductive material patterned to include a second active area for receiving an application of active material and a second plurality of conductive tabs formed integrally with the second active area, and
a second active material on the second active area of the cathode collector, the second active material not being on the second plurality of conductive tabs, wherein the cathode is subdivided into a second plurality of panel regions and each panel region of the second plurality of panel regions includes only one of the conductive tabs of the second plurality of conductive tabs; and
a separator including a dielectric material between the anode collector and the cathode collector, wherein:
each conductive tab in the first plurality of conductive tabs is electrically coupled to the first electrical contact of the housing and each conductive tab in the second plurality of conductive tabs is electrically coupled to the second electrical contact of the housing,
the first end of the anode is folded around the first end of the cathode so that a first panel region of the anode is on a first side of the cathode, a second panel region of the anode is on a second side of the cathode, and only a single panel region of the cathode is between the first panel region of the anode and the second panel region of the anode, and
the second end of the cathode is folded around the second end of the anode so that a first panel region of the cathode is on a first side of the anode, a second panel region of the cathode is on a second side of the anode, and only a single panel region of the anode is between the first panel region of the cathode and the second panel region of the cathode.

2. The battery of claim 1, wherein a first distance between a first conductive tab in the first plurality of conductive tabs and a second conductive tab in the first plurality of conductive tabs is between 2% and 5% greater than a second distance between the second conductive tab and a third conductive tab in the first plurality of conductive tabs, wherein the first conductive tab is adjacent to the second conductive tab and the second conductive tab is adjacent to the third conductive tab.

3. The battery of claim 1, wherein an entire front surface of the anode collector excluding the first plurality of conductive tabs is coated in the first active material, an entire back surface of the anode collector excluding the first plurality of conductive tabs is coated in the first active material, an entire front surface of the cathode collector excluding the second plurality of conductive tabs is coated in the second active material, and an entire back surface of the cathode collector excluding the second plurality of conductive tabs is coated in the second active material.

4. A device, comprising:
a housing; and
a laminate disposed in the housing, the laminate including:
a first current collector having a first end and an opposing second end and including a first plurality of conductive tabs, the first current collector being subdivided into a first plurality of panel regions and each panel region in the first plurality of panel regions including a conductive tab of the first plurality of conductive tabs,
a separator including a dielectric material, the separator being attached to the first current collector, and
a second current collector having a first end and an opposing second end and including a second plurality of conductive tabs, the second current collector being subdivided into a second plurality of panel regions and each panel region in the second plurality of panel regions including a conductive tab of the second plurality of conductive tabs, the second current collector being attached to the separator, wherein:
a first end of the first current collector is folded around a first end of the second current collector so that a first panel region of the first current collector is on a first side of the first end of the second current collector, a second panel region of the first current collector is on a second side of the first end of the second current collector, and only a single panel region of the second current collector is between the first panel region of the first current collector and the second panel region of the first current collector, and
a second end of the second current collector is folded around a second end of the first current collector so that a first panel region of the second current collector is on a first side of the second end of the first current collector, a second panel region of the second current collector is on a second side of the second end of the first current collector, and only a single panel region of the first current collector is between the first panel region of the second current collector and the second panel region of the second current collector.

5. The device of claim 4, wherein the first current collector includes a first sheet of conductive material patterned to include an active area for receiving an application of active material and the first plurality of conductive tabs and further comprising a first active material on the active area of the first current collector, the first active material not being on the first plurality of conductive tabs.

6. The device of claim 5, wherein a distance between adjacent conductive tabs in the first plurality of conductive tabs increases from the first end of the first current collector to the second end of the first current collector.

7. The device of claim 5, wherein the active area of the first current collector includes a front surface and a back surface opposite the front surface and the first active material is on the front surface and the back surface of the active area of the first current collector.

8. The device of claim 7, wherein an entire front surface of the first current collector excluding the first plurality of conductive tabs is coated in the first active material, and an entire back surface of the first current collector excluding the first plurality of conductive tabs is coated in the first active material.

9. The device of claim 5, wherein the first active material includes at least one of graphite, silicon, and a graphite-silicon composite.

10. The device of claim 5, wherein the housing includes a first electrical contact and each conductive tab in the first plurality of conductive tabs is electrically coupled to the first electrical contact.

11. The device of claim 5, wherein the second current collector includes a second sheet of conductive material patterned to include an active area and the second plurality of conductive tabs and further comprising a second active material on the active area of the second current collector, the second active material not being on the second plurality of conductive tabs.

12. The device of claim 4, wherein the laminate is in a spiral shape within the housing.

13. A device, comprising:
   a housing; and
   a laminate disposed in the housing, the laminate including:
      a first current collector having a first end and an opposing second end,
      a second current collector having a first end and an opposing second end, wherein a first end of the first current collector is folded around a first end of the second current collector so that a first panel region of the first current collector is on a first side of the second current collector, the first panel region of the first current collector including a first conductive tab, a second panel region of the first current collector is on a second side of the second current collector, the second panel region of the first current collector including a second conductive tab, and a single panel region of the second current collector is between the first panel region of the first current collector and the second panel region of the first current collector, the single panel region of the second current collector including a third conductive tab, a second end of the second current collector is folded around a second end of the first current collector so that a first panel region of the second current collector is on a first side of the second end of the first current collector, a second panel region of the second current collector is on a second side of the second end of the first current collector, and only a single panel region of the first current collector is between the first panel region of the second current collector and the second panel region of the second current collector; and
      a separator including a dielectric material, wherein at least a portion of the separator is between the first current collector and the second current collector.

14. The device of claim 13, wherein the first current collector includes a first sheet of conductive material patterned to include an active area and a first plurality of conductive tabs, the active area for receiving an application of active material, and further comprising a first active material on the active area of the first current collector, the first active material not being on the first plurality of conductive tabs.

15. The device of claim 14, wherein the housing includes a first electrical contact and each conductive tab in the first plurality of conductive tabs is electrically coupled to the first electrical contact.

16. The device of claim 14, wherein the second current collector includes a second sheet of conductive material patterned to include an active area and a second plurality of conductive tabs and further comprising a second active material on the active area of the second current collector, the second active material not being on the second plurality of conductive tabs.

* * * * *